United States Patent
Kakimoto et al.

(10) Patent No.: US 12,330,719 B2
(45) Date of Patent: Jun. 17, 2025

(54) STEERING SYSTEM

(71) Applicants: JTEKT CORPORATION, Osaka (JP); TOYOTA JIDOSHA KABUSHIKI KAISHA, Toyota (JP)

(72) Inventors: Yusuke Kakimoto, Okazaki (JP); Takashi Kodera, Okazaki (JP); Kenji Shibata, Nagoya (JP); Takafumi Sato, Kariya (JP)

(73) Assignees: JTEKT CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 314 days.

(21) Appl. No.: 17/347,258

(22) Filed: Jun. 14, 2021

(65) Prior Publication Data
US 2021/0394821 A1 Dec. 23, 2021

(30) Foreign Application Priority Data
Jun. 18, 2020 (JP) .................. 2020-105198

(51) Int. Cl.
*B62D 5/04* (2006.01)
*B62D 5/00* (2006.01)
(Continued)

(52) U.S. Cl.
CPC ........... *B62D 5/0481* (2013.01); *B62D 5/006* (2013.01); *B62D 5/046* (2013.01); *B62D 6/002* (2013.01);
(Continued)

(58) Field of Classification Search
None
See application file for complete search history.

(56) References Cited

U.S. PATENT DOCUMENTS 6,865,462 B2 * 3/2005 Yao .................. B62D 6/002
  701/41
6,922,620 B2 * 7/2005 Augustine ............ B60R 25/02
  701/41
(Continued)

FOREIGN PATENT DOCUMENTS

CN 113840770 A * 12/2021 .......... B60W 10/20
CN 113840770 B * 6/2024 .......... B60W 10/20
(Continued)

OTHER PUBLICATIONS

Nov. 9, 2021 Extended Search Report issued in European Patent Application No. 21179416.9.
(Continued)

*Primary Examiner* — Kevin R Steckbauer
(74) *Attorney, Agent, or Firm* — Oliff PLC

(57) ABSTRACT

A steering system includes a steering operation shaft in which power transmission to and from a steering wheel is disabled and that steers a steered wheel of a vehicle, a steering operation motor that generates a steering operation force that is a torque applied to the steering operation shaft so as to steer the steered wheel, and a control device that controls the steering operation motor. When a rotation position of the steering wheel is different from a rotation position corresponding to a steered position of the steered wheel, the control device executes a process for correcting the steered position of the steered wheel to a position corresponding to the rotation position of the steering wheel through the steering operation motor.

1 Claim, 6 Drawing Sheets

(51) Int. Cl.
*B62D 6/00* (2006.01)
*B62D 15/02* (2006.01)

(52) U.S. Cl.
CPC ............ *B62D 6/008* (2013.01); *B62D 15/02* (2013.01); *B62D 15/021* (2013.01)

(56) References Cited

U.S. PATENT DOCUMENTS

| | | | | |
|---|---|---|---|---|
| 11,414,122 | B2* | 8/2022 | Zheng | B62D 5/0463 |
| 11,541,862 | B2* | 1/2023 | Rehn | B60W 40/105 |
| 2003/0088351 | A1* | 5/2003 | Augustine | B62D 6/008 |
| | | | | 180/443 |
| 2004/0236487 | A1* | 11/2004 | Yao | B62D 6/002 |
| | | | | 180/443 |
| 2020/0277004 | A1* | 9/2020 | Zheng | B62D 5/0463 |
| 2020/0398891 | A1* | 12/2020 | Szepessy | B62D 15/021 |
| 2021/0394821 | A1* | 12/2021 | Kakimoto | B62D 15/02 |
| 2022/0242482 | A1* | 8/2022 | Kim | B62D 5/0463 |

FOREIGN PATENT DOCUMENTS

| | | | | | |
|---|---|---|---|---|---|
| DE | 10011710 | A1 | * | 10/2001 | ............ B62D 15/02 |
| DE | 10011710 | B4 | * | 7/2005 | ............ B62D 15/02 |
| DE | 102021204278 | A1 | * | 11/2022 | |
| JP | 2004099011 | A | * | 4/2004 | |
| JP | 2006-321434 | A | | 11/2006 | |
| JP | 2012-071692 | A | | 4/2012 | |
| KR | 2173996 | B1 | * | 11/2020 | ............ B60W 10/20 |
| WO | WO-2019052651 | A1 | * | 3/2019 | ........... B62D 15/021 |

OTHER PUBLICATIONS

Aug. 8, 2023 Office Action issued in Japanese Patent Application No. 2020-105198 with partial translation.

* cited by examiner

WHEN Δθ < θ_th IS SATISFIED

SBW NORMAL CONTROL

WHEN Δθ < θ_th IS NOT SATISFIED

SYNCHRONIZATION CONTROL

STEERING SYSTEM

CROSS-REFERENCE TO RELATED APPLICATION

This application claims priority to Japanese Patent Application No. 2020-105198 filed on Jun. 18, 2020, incorporated herein by reference in its entirety.

BACKGROUND

1. Technical Field

The present disclosure relates to a steering system for a vehicle.

2. Description of Related Art

There is a so-called steer-by-wire steering system in which there is no mechanical power transmission between a steering wheel and steered wheels. The steering system includes a reaction mechanism having a reaction motor that is a generation source of steering reaction force applied to a steering shaft and a steering operation mechanism having a steering operation motor that is a generation source of steering operation force for steering the steered wheels. When the vehicle is running, a control device of the steering system generates the steering reaction force through power supply control to the reaction motor, and steers the steered wheels through power supply control to the steering operation motor.

In the steer-by-wire steering system, the steering wheel is not restricted by the steering operation mechanism. Therefore, when some external force is applied to the steering wheel while the power of the vehicle is off, the steering wheel may rotate. At this time, since the steered wheels do not operate, the positional relationship between the steering wheel and the steered wheels differs from the original positional relationship in accordance with a predetermined steering angle ratio. The steering angle ratio means the ratio between the steering angle of the steering wheel and the steered angle of the steered wheels.

Thus, for example, in the steering system of Japanese Unexamined Patent Application Publication No. 2006-321434 (JP 2006-321434 A), when the power of the vehicle is turned on, a correction process of the rotation position of the steering wheel is executed. The control device of the steering system stores the rotation position of the steering wheel at the time when the power of the vehicle is turned off. The control device calculates the deviation amount of the rotation position of the steering wheel through comparison between the rotation position of the steering wheel when the power of the vehicle is turned off and the rotation position of the steering wheel when the power of the vehicle is turned on, and causes the reaction motor to drive such that the amount of deviation becomes zero (0).

SUMMARY

According to the steering system of JP 2006-321434 A, the deviation of the positional relationship between the steering wheel and the steered wheels is certainly improved. However, the steering wheel automatically rotates at the timing when the power of the vehicle is turned on, in order to correct the positional relationship between the steering wheel and the steered wheels. The driver may feel a sense of discomfort with the automatic rotation of the steering wheel. In addition, the driver cannot start the vehicle during the period from the time when the power of the vehicle is turned on until the correction process of the rotation position of the steering wheel is completed. Therefore, the driver may feel stress.

The present disclosure provides a steering system capable of reducing the driver's discomfort or stress with respect to the correction process of the positional relationship between the steering wheel and the steered wheels.

A steering system according to an aspect of the present disclosure includes a steering operation shaft in which power transmission to and from a steering wheel is disabled and that steers a steered wheel of a vehicle, a steering operation motor that generates a steering operation force that is a torque applied to the steering operation shaft so as to steer the steered wheel, and a control device that controls the steering operation motor. In a case where at least one of starting of the vehicle and steering of the steering wheel is performed for the first time after power of the vehicle is turned on, when a rotation position of the steering wheel is different from a rotation position corresponding to a steered position of the steered wheel, the control device executes a process for correcting the steered position of the steered wheel to a position corresponding to the rotation position of the steering wheel through the steering operation motor.

With this configuration, at the timing when at least one of the starting of the vehicle and the steering of the steering wheel is performed for the first time after the power of the vehicle is turned on, the steered position of the steered wheel is automatically adjusted to the position corresponding to the rotation position of the steering wheel. Therefore, as compared with the case where the steered position is automatically adjusted in the stopped state or the non-steering state, the driver's discomfort or stress with respect to the automatic adjustment operation for the steered position of the steered wheels is reduced.

In the above aspect, the steering system may further include a steering shaft that rotates in conjunction with operation of the steering wheel, and a reaction motor that generates a steering reaction force that is a torque applied to the steering shaft and acting in a direction opposite to a steering direction. The control device may have a function of executing, when the power of the vehicle is turned on and the rotation position of the steering wheel is different from a correct rotation position corresponding to the steered position of the steered wheel, a correction process of causing the steering wheel to rotate through the reaction motor so as to reduce a deviation amount of the rotation position of the steering wheel with respect to the correct rotation position. In a case where the power of the vehicle is turned on, when the deviation amount is equal to or more than a predetermined allowable amount, the control device may execute the correction process, whereas when the deviation amount is less than the predetermined allowable amount, the control device may execute the process for correcting the steered position of the steered wheel to the position corresponding to the rotation position of the steering wheel without executing the correction process.

With this configuration, when the power of the vehicle is turned on and the deviation amount of the rotation position of the steering wheel with respect to the steered position of the steered wheel is equal to or more than the predetermined allowable amount, the correction process of the rotation position of the steering wheel is executed. Through the execution of this correction process, the deviation amount of the rotation position of the steering wheel is reduced. Thus, it is possible to start the vehicle while suppressing the discomfort given to the driver.

When the power of the vehicle is turned on and the deviation amount of the rotation position of the steering wheel with respect to the steered position of the steered wheel is less than the predetermined allowable amount, the correction process of the rotation position of the steering wheel is not executed. At the timing when at least one of the starting of the vehicle and the steering of the steering wheel is performed for the first time, the steered position of the steered wheels is automatically adjusted to the position corresponding to the rotation position of the steering wheel. The steering wheel does not automatically rotate at the timing when the power of the vehicle is turned on, so that the driver does not feel a sense of discomfort. Furthermore, the driver does not have to wait for the completion of the correction process of the rotation position of the steering wheel. Therefore, the driver does not feel stress.

In the above aspect, as the process for correcting the steered position of the steered wheel to the position corresponding to the rotation position of the steering wheel, the control device may control the steering operation motor such that the steered position of the steered wheel gradually changes toward the position corresponding to the rotation position of the steering wheel.

With this configuration, the steered position of the steered wheel gradually changes toward the position corresponding to the rotation position of the steering wheel. Since the sudden movement of the steered wheel is suppressed, the driver is less likely to feel a sense of discomfort.

With the steering system of the above aspect, it is possible to reduce the driver's discomfort or stress with respect to the correction process of the positional relationship between the steering wheel and the steered wheel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
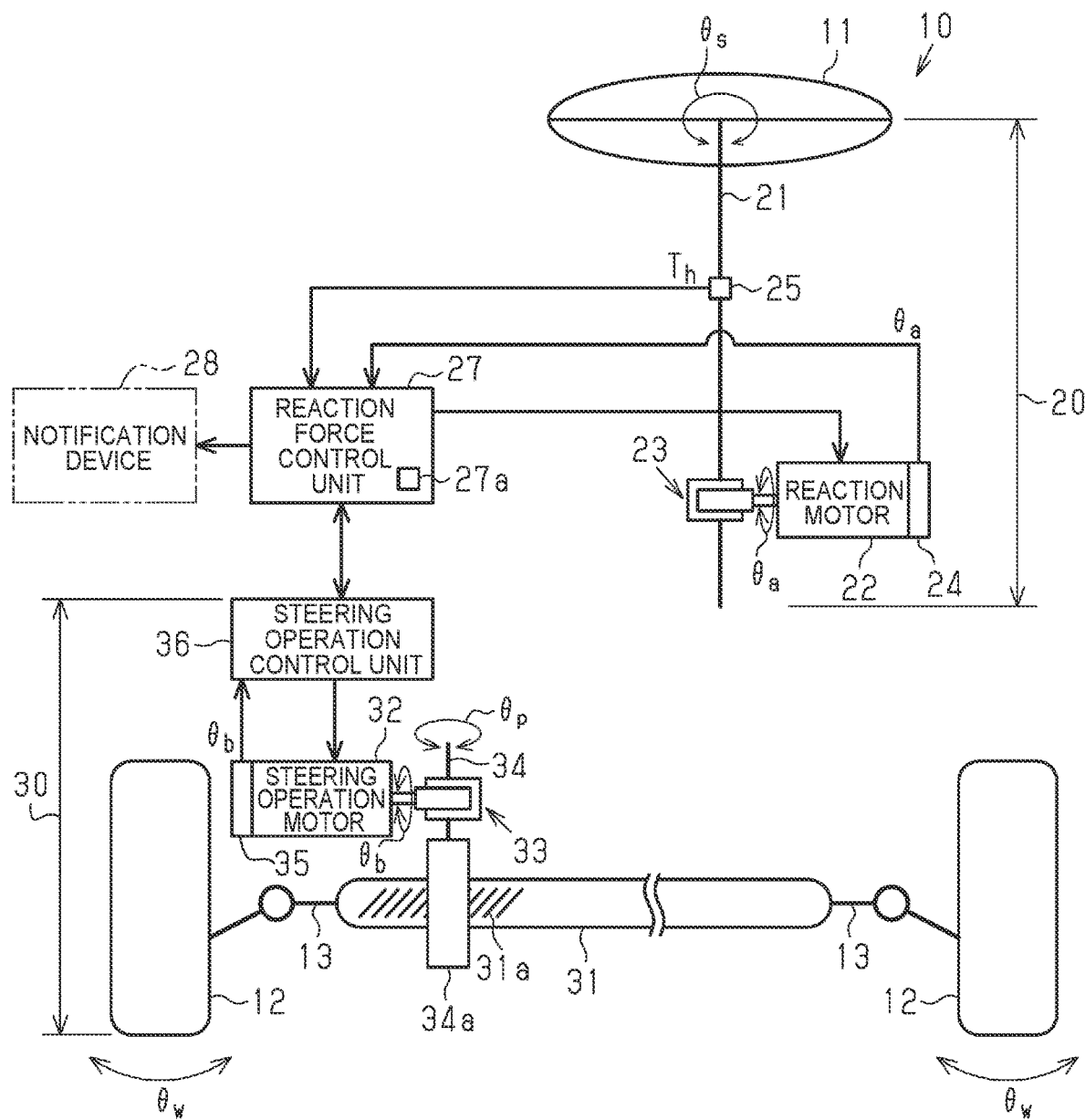
FIG. 1 is a configuration diagram showing an embodiment of a steering system.

Hereinafter, a first embodiment in which a steering system is embodied will be described. As shown in FIG. 1, a steering system 10 for a vehicle includes a reaction force unit 20 that applies a steering reaction force to a steering wheel 11 of the vehicle, and a steering operation unit 30 that steers steered wheels 12, 12 of the vehicle. The steering reaction force means a torque acting in a direction opposite to the operating direction of the steering wheel 11 by the driver. By applying the steering reaction force to the steering wheel 11, it is possible to give the driver an appropriate feeling of response.

The reaction force unit 20 includes a steering shaft 21 to which the steering wheel 11 is connected, a reaction motor 22, a reduction mechanism 23, a rotation angle sensor 24, a torque sensor 25, and a reaction force control unit 27.

The reaction motor 22 is a generation source of the steering reaction force. As the reaction motor 22, for example, a three-phase brushless motor is adopted. The reaction motor 22 is connected to the steering shaft 21 via the reduction mechanism 23. The torque generated by the reaction motor 22 is applied to the steering shaft 21 as the steering reaction force.

The rotation angle sensor 24 is provided on the reaction motor 22. The rotation angle sensor 24 detects a rotation angle $\theta_a$ of the reaction motor 22. The torque sensor 25 is provided in a portion of the steering shaft 21 between the reduction mechanism 23 and the steering wheel 11. The torque sensor 25 detects a steering torque $T_h$ applied to the steering shaft 21 through the rotational operation of the steering wheel 11.

The reaction force control unit 27 calculates a steering angle $\theta_s$ that is the rotation angle of the steering shaft 21, based on the rotation angle $\theta_a$ of the reaction motor 22 detected through the rotation angle sensor 24. The reaction force control unit 27 counts the number of rotations of the reaction motor 22 with the motor midpoint as a reference. The motor midpoint represents the rotation angle $\theta_a$ of the reaction motor 22 corresponding to the steering neutral position of the steering wheel 11. The reaction force control unit 27 calculates an integrated angle that is an angle obtained by integrating the rotation angle $\theta_a$ with the motor midpoint as the origin, and multiplies the calculated integrated angle by a conversion factor based on the reduction ratio of the reduction mechanism 23, so as to calculate the steering angle $\theta_s$ of the steering wheel 11. The motor midpoint is stored in the reaction force control unit 27 as steering angle midpoint information.

The reaction force control unit 27 executes reaction force control for generating the steering reaction force corresponding to the steering torque $T_h$ through drive control of the reaction motor 22. The reaction force control unit 27 calculates a target steering reaction force based on the steering torque $T_h$ that is detected through the torque sensor 25, and calculates a target steering angle of the steering wheel 11 based on the calculated target steering reaction force and the steering torque $T_h$. The reaction force control unit 27 obtains the difference between the steering angle $\theta_s$ calculated based on the rotation angle $\theta_a$ of the reaction motor 22 and the target steering angle, and controls the power supply to the reaction motor 22 so as to eliminate the difference. The reaction force control unit 27 vector-controls the reaction motor 22 using the rotation angle $\theta_a$ of the reaction motor 22 that is detected through the rotation angle sensor 24.

The steering operation unit 30 includes a steering operation shaft 31, a steering operation motor 32, a reduction mechanism 33, a pinion shaft 34, a rotation angle sensor 35, and a steering operation control unit 36. The steering operation shaft 31 extends along the vehicle width direction (left-right direction in FIG. 1). The right and left steered wheels 12, 12 are respectively connected to opposite ends of the steering operation shaft 31 via tie rods 13, 13.

The steering operation motor 32 is a generation source of steering operation force. As the steering operation motor 32, for example, a three-phase brushless motor is adopted. The steering operation motor 32 is connected to the pinion shaft 34 via the reduction mechanism 33. Pinion teeth 34a of the pinion shaft 34 are meshed with rack teeth 31a of the steering operation shaft 31. Torque generated by the steering operation motor 32 is applied to the steering operation shaft 31 as a steering operation force via the pinion shaft 34. The steering operation shaft 31 moves along the vehicle width direction (left-right direction in FIG. 1) with the rotation of the steering operation motor 32. As the steering operation shaft 31 moves, a steered angle $\theta_w$ of the steered wheels 12, 12 is changed.

The rotation angle sensor 35 is provided on the steering operation motor 32. The rotation angle sensor 35 detects a rotation angle $\theta_b$ of the steering operation motor 32. The steering operation control unit 36 executes steering operation control for steering the steered wheels 12, 12 in accordance with the steering state through the drive control of the steering operation motor 32. The steering operation control unit 36 calculates a pinion angle $\theta_p$ that is a rotation angle of the pinion shaft 34, based on the rotation angle $\theta_b$ of the steering operation motor 32 that is detected through the rotation angle sensor 35. Furthermore, the steering operation control unit 36 calculates a target pinion angle that is a target value of the pinion angle $\theta_p$ using the target steering angle or the steering angle $\theta_s$ calculated by the reaction force control unit 27. Note that the target pinion angle is calculated from the viewpoint of achieving a predetermined steering angle ratio. The steering operation control unit 36 obtains the difference between the target pinion angle and the actual pinion angle $\theta_p$, and controls the power supply to the steering operation motor 32 so as to eliminate the difference. The steering operation control unit 36 vector-controls the steering operation motor 32 using the rotation angle $\theta_b$ of the steering operation motor 32 that is detected through the rotation angle sensor 35.

Here, in the steer-by-wire steering system 10, the steering wheel 11 is not restricted by the steering operation unit 30. Therefore, the following events may occur.

That is, when the power of the vehicle is on, the steering wheel 11 and the steered wheels 12, 12 are synchronized. Therefore, the positional relationship between the steering wheel 11 and the steered wheels 12, 12 is maintained in a positional relationship in accordance with the predetermined steering angle ratio. However, when some external force is applied to the steering wheel 11 while the power of the vehicle is off, the steering wheel 11 may rotate. At this time, the steering operation shaft 31 does not operate. Therefore, the positional relationship between the steering wheel 11 and the steered wheels 12, 12 may differ from the original positional relationship in accordance with the predetermined steering angle ratio.

Thus, when the power of the vehicle is turned on again, the steering system 10 executes synchronization control for synchronizing the rotation position of the steering wheel 11 with the steered position of the steered wheels 12, 12, as an initial operation. It is conceivable that the steering system 10 executes the following process as an example of the synchronization control.

For example, in the case where the steering wheel 11 rotates counterclockwise (in the positive direction) by a predetermined angle while the power of the vehicle is off, when the power of the vehicle is turned on again, the steering wheel 11 is rotated clockwise (in the negative direction) by a predetermined angle through the drive control of the reaction motor 22. As a result, the positional relationship between the steering wheel 11 and the steered wheels 12, 12 returns to the original positional relationship in accordance with the predetermined steering angle ratio.

When the power of the vehicle is switched from on to off, the reaction force control unit 27 stores the steering angle $\theta_s$ calculated immediately before that in its own storage device 27a as a reference steering angle. The reference steering angle serves as a reference for determining whether the steering wheel 11 is rotated during the period in which the power of the vehicle is off.

When the power of the vehicle is switched from off to on, the reaction force control unit 27 determines whether the position adjustment of the steering wheel 11 is necessary, through comparison between the reference steering angle stored in the storage device 27a and the steering angle $\theta_s$ calculated immediately after the power of the vehicle is turned on.

When the reference steering angle that is the steering angle $\theta_s$ immediately before the power of vehicle is turner off and the steering angle $\theta_s$ immediately after the power of the vehicle is turned on again match each other, the reaction force control unit 27 determines that the position adjustment of the steering wheel 11 is not necessary. It is clear that the steering wheel 11 is not rotating during the period from the time when the power of the vehicle is turned off until the power of the vehicle is turned on again because the steering angle $\theta_s$ has not changed. The reaction force control unit 27 starts executing the normal reaction force control for generating the steering reaction force in accordance with the steering torque $T_h$.

When the reference steering angle that is the steering angle $\theta_s$ immediately before the power of vehicle is turner off and the steering angle $\theta_s$ immediately after the power of the vehicle is turned on again do not march each other, the reaction force control unit 27 determines that the position adjustment of the steering wheel 11 is necessary and performs the position adjustment of the steering wheel 11. The reaction force control unit 27 obtains, for example, the difference between the reference steering angle and the steering angle $\theta_s$ immediately after the power of the vehicle is turned on, and controls the power supply to the reaction motor 22 so as to eliminate the difference. Specifically, the reaction force control unit 27 sets the reference steering angle as the target steering angle that is a target value of the steering angle $\theta_s$, and executes feedback control of the steering angle $\theta_s$ such that the steering angle $\theta_s$ follows the set target steering angle. When the target steering angle and the current steering angle $\theta_s$ match each other, the position adjustment of the steering wheel 11 is completed.

The reaction force control unit 27 may use the following value as the reference steering angle. That is, the reaction force control unit 27 acquires the pinion angle $\theta_p$, which is the rotation angle of the pinion shaft 34 immediately after the power of the vehicle is switched from off to on, from the steering operation control unit 36, and calculates the steering angle $\theta_s$ corresponding to the acquired pinion angle $\theta_p$ based on the steering angle ratio. The reaction force control unit 27 uses the steering angle $\theta_s$ corresponding to the calculated pinion angle $\theta_p$ as the reference steering angle. Also in this way, the rotation position of the steering wheel 11 can be corrected to a position corresponding to the steered position of the steered wheels 12, 12.

However, in order to correct the positional relationship between the steering wheel 11 and the steered wheels 12, 12, the steering wheel 11 automatically rotates at the timing when the power of the vehicle is turned on. The driver may feel a sense of discomfort with the automatic rotation of the steering wheel. In addition, the driver cannot start the vehicle during the period from the time when the power of the vehicle is turned on until the correction process of the rotation position of the steering wheel is completed. Therefore, the driver may feel stress.

Thus, in the present embodiment, the following process is executed as an initial operation when the power of the vehicle is switched from off to on, from the viewpoint of reducing the driver's discomfort or stress with respect to the correction process of the positional relationship between the steering wheel and the steered wheels.

Figure 2:
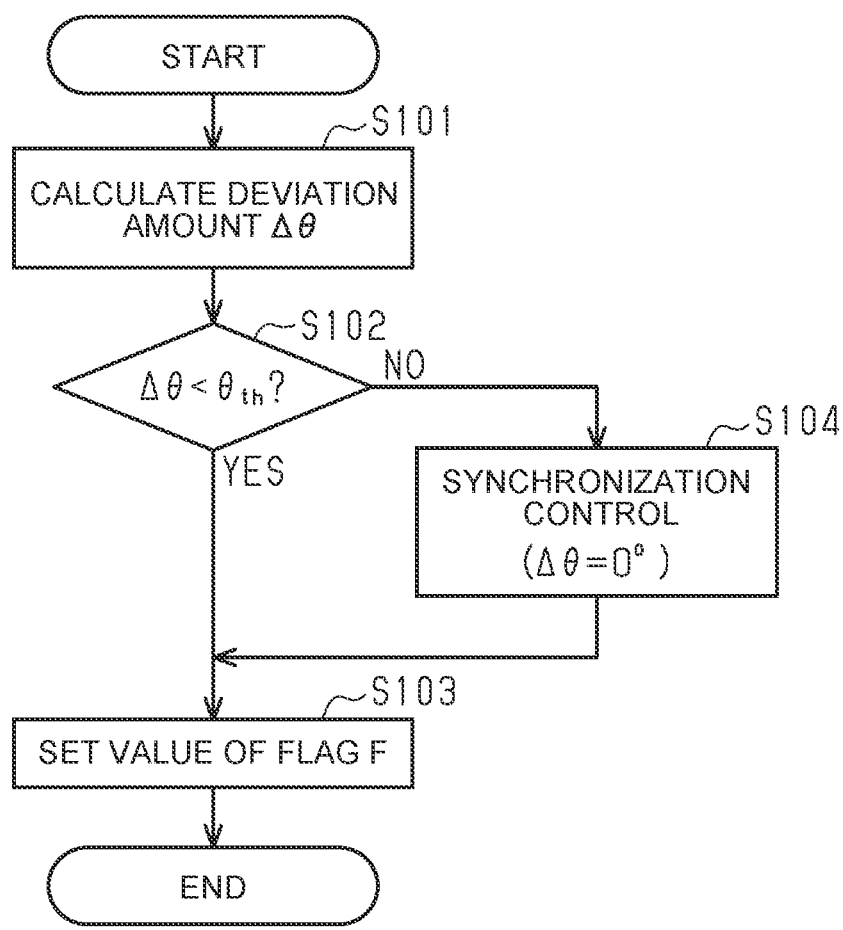
FIG. 2 is a flowchart showing a process procedure of synchronization control by a reaction force control unit of the embodiment.

As shown in the flowchart of FIG. 2, the reaction force control unit 27 first calculates a deviation amount $\Delta\theta$ of the rotation position of the steering wheel 11 with respect to the steered position of the steered wheels 12, 12 (step S101). The deviation amount $\Delta\theta$ is also the amount of rotation of the steering wheel 11 that is required to correct the rotation position of the steering wheel 11 to the rotation position corresponding to the steered position of the steered wheels 12, 12. The reaction force control unit 27 calculates the deviation amount $\Delta\theta$ using, for example, the following equation (A).

$$\Delta\theta = |\theta_{s0} - \theta_s| \quad (A)$$

Note that "$\theta_{s0}$" is the reference steering angle stored in the storage device 27a immediately before the power of the vehicle is turned off last time. The "$\theta_s$" is the steering angle immediately after the power of the vehicle is turned on. The sign of the steering angle $\theta_s$ is, for example, negative in the right steering direction and positive in the left steering direction with reference to the steering neutral position ($\theta_s=0°$) of the steering wheel 11.

Then, the reaction force control unit 27 determines whether the deviation amount $\Delta\theta$ has a smaller value than an angle threshold value $\theta_{th}$ (step S102). The angle threshold value $\theta_{th}$ is set based on an angle that does not give the driver a sense of discomfort, when, for example, the steered position of the steered wheels 12, 12 is corrected to match the rotation position of the steering wheel 11 at the timing of starting the vehicle. Furthermore, the angle threshold value $\theta_{th}$ can be regarded as an allowable amount with respect to the deviation amount $\Delta\theta$.

When the deviation amount $\Delta\theta$ has a smaller value than the angle threshold value $\theta_{th}$ (YES in step S102), the reaction force control unit 27 sets the value of the flag F to "1" (step S103), and ends the process. In this case, the steering wheel 11 does not rotate automatically.

The flag F is information indicating whether the initial operation by the reaction force control unit 27 is completed. The initial value of the flag F is "0". When the deviation amount $\Delta\theta$ have a value not smaller than the angle threshold value $\theta_{th}$ (NO in step S102), the reaction force control unit 27 executes the synchronization control (step S104).

The synchronization control is control for correcting the rotation position of the steering wheel 11 to the position corresponding to the steered position of the steered wheels 12, 12. The reaction force control unit 27 controls the power supply to the reaction motor 22 such that the deviation amount $\Delta\theta$ calculated in the previous step S101 becomes "0". More specifically, the reaction force control unit 27 sets the reference steering angle $\theta_{s0}$ as the target steering angle, and executes the feedback control of the steering angle $\theta_s$ such that the steering angle $\theta_s$ follows the set target steering angle. When the steering angle $\theta_s$ match the target steering angle, the execution of the synchronization control is completed. The synchronization control can be regarded as the correction process of rotating the steering wheel 11 such that the deviation amount $\Delta\theta$ becomes zero.

When the execution of the synchronization control is completed, the reaction force control unit 27 sets the value of the flag F to "1" (step S103), and ends the process. When the power of the vehicle is switched from off to on, the steering operation control unit 36 executes the following process, triggered by the fact that the value of the flag F set by the reaction force control unit 27 is switched from the initial value of "0" to "1".

That is, when the steering angle $\theta_s$ calculated by the reaction force control unit 27 is an angle corresponding to the pinion angle $\theta_p$ that is the rotation angle of the pinion shaft 34, the steering operation control unit 36 starts executing the normal steering operation control for generating a steering operation force in accordance with the target steering angle $\theta_s$* or the steering angle $\theta_s$. In contrast, when the steering angle $\theta_s$ calculated by the reaction force control unit 27 is not an angle corresponding to the pinion angle $\theta_p$ that is the rotation angle of the pinion shaft 34, the steering operation control unit 36 controls the power supply to the steering operation motor 32 so as to correct the pinion angle $\theta_p$ to the angle corresponding to the steering angle $\theta_s$. As a result, the steered position of the steered wheels 12, 12 is synchronized with the position corresponding to the rotation position of the steering wheel 11.

Next, the behavior of the steering wheel 11 and the steered wheels 12, 12 during the period from the time when the power of the vehicle is turned on until the rotation position of the steering wheel 11 and the steered position of the steered wheels 12, 12 are synchronized will be described for two situations.

Note that, as a premise, immediately after the power of the vehicle is turned on, the steered wheels 12, 12 are positioned at the steering neutral position (steered angle $\theta_w=0°$) corresponding to the straight-ahead state of the vehicle. Originally, the steering wheel 11 should be positioned at the steering neutral position (steering angle $\theta_s=0°$) corresponding to the straight-ahead state of the vehicle. Furthermore, the steering angle ratio, which is the ratio of the steering angle $\theta_s$ to the steered angle $\theta_w$, is "1:1", that is, the value of the steering angle ratio is "1".

Figure 3:
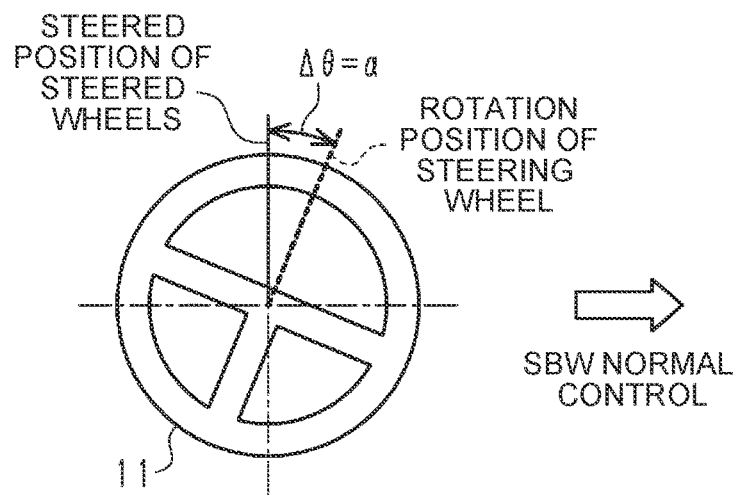
FIG. 3 (a) and FIG. 3 (b) are front views showing a first example of change in a rotation position of the steering wheel when power of a vehicle is turned on in the embodiment.
Figure 3:
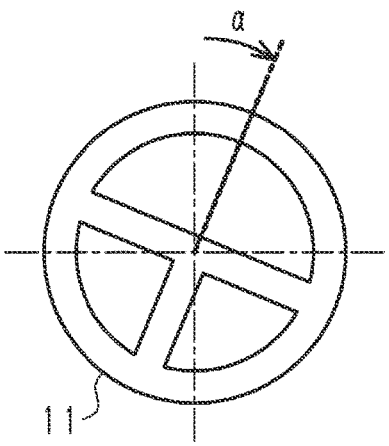

First, a first situation will be described. As shown in (a) of FIG. 3, immediately after the power of the vehicle is turned on, the steering wheel 11 is held at a position that the steering wheel 11 has been rotated clockwise (in the negative direction) with respect to the steered position of the steered wheels 12, 12 by an angle α having a value smaller than the angle threshold value $\theta_{th}$. That is, the deviation amount $\Delta\theta$ of the rotation position of the steering wheel 11 with respect to the steered position of the steered wheels 12, 12 is the angle α. In this case, the synchronization control of the steering wheel 11 is not executed, and the state of the steering system 10 transitions to a state in which the normal reaction force control and the normal steering operation control can be executed. After that, as shown in (b) of FIG. 3, the steered position of the steered wheels 12, 12 are synchronized with the rotation position of the steering wheel 11. Here, since the value of the steering angle ratio is "1", the steered wheels 12, 12 are steered clockwise by the angle α.

Figure 4:
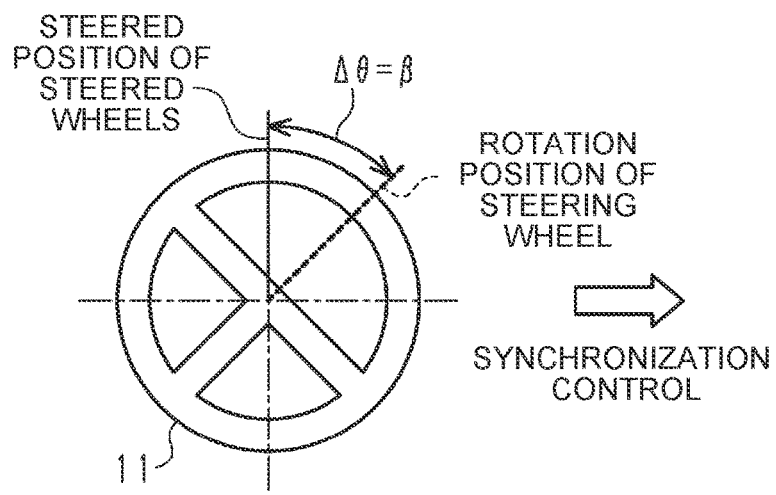
FIG. 4 (a) and FIG. 4 (b) are front views showing a second example of change in the rotation position of the steering wheel when the power of the vehicle is turned on in the embodiment.
Figure 4:
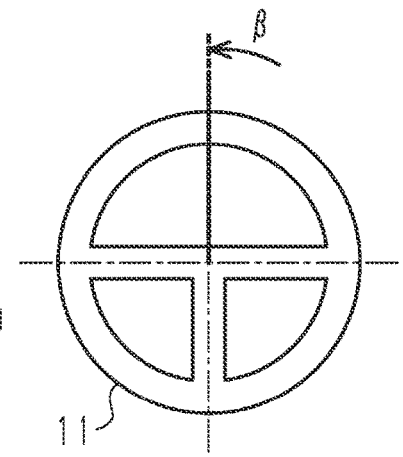

Next, a second situation will be described. As shown in (a) of FIG. 4, immediately after the power of the vehicle is turned on, the steering wheel 11 is held at a position that the steering wheel 11 has been rotated clockwise (in the negative direction) with respect to the steered position of the steered wheels 12, 12 by an angle β having a value equal to or larger than the angle threshold value $\theta_{th}$. That is, the deviation amount Δθ of the rotation position of the steering wheel 11 with respect to the steered position of the steered wheels 12, 12 is the angle β. In this case, the synchronization control of the steering wheel 11 is executed. As shown in (b) of FIG. 4, the rotation position of the steering wheel 11 is synchronized with the steered position of the steered wheels 12, 12 through the execution of the synchronization control. Here, since the value of the steering angle ratio is "1", the steering wheel 11 is rotated counterclockwise by the angle θ that is the deviation amount Δθ. After the execution of the synchronization control is completed, the state of the steering system 10 transitions to the state in which the normal reaction force control and the normal steering operation control can be executed.

Note that, when the value of the deviation amount Δθ is smaller than the angle threshold value $\theta_{th}$, as in the first situation described above, the steered wheels 12, 12 are automatically steered only slightly with the execution of the adjustment process of the steered position. Therefore, for example, depending on the execution timing of the adjustment process of the steered position, the driver may feel a sense of discomfort with respect to the operation of the steered wheels 12, 12.

Figure 5:
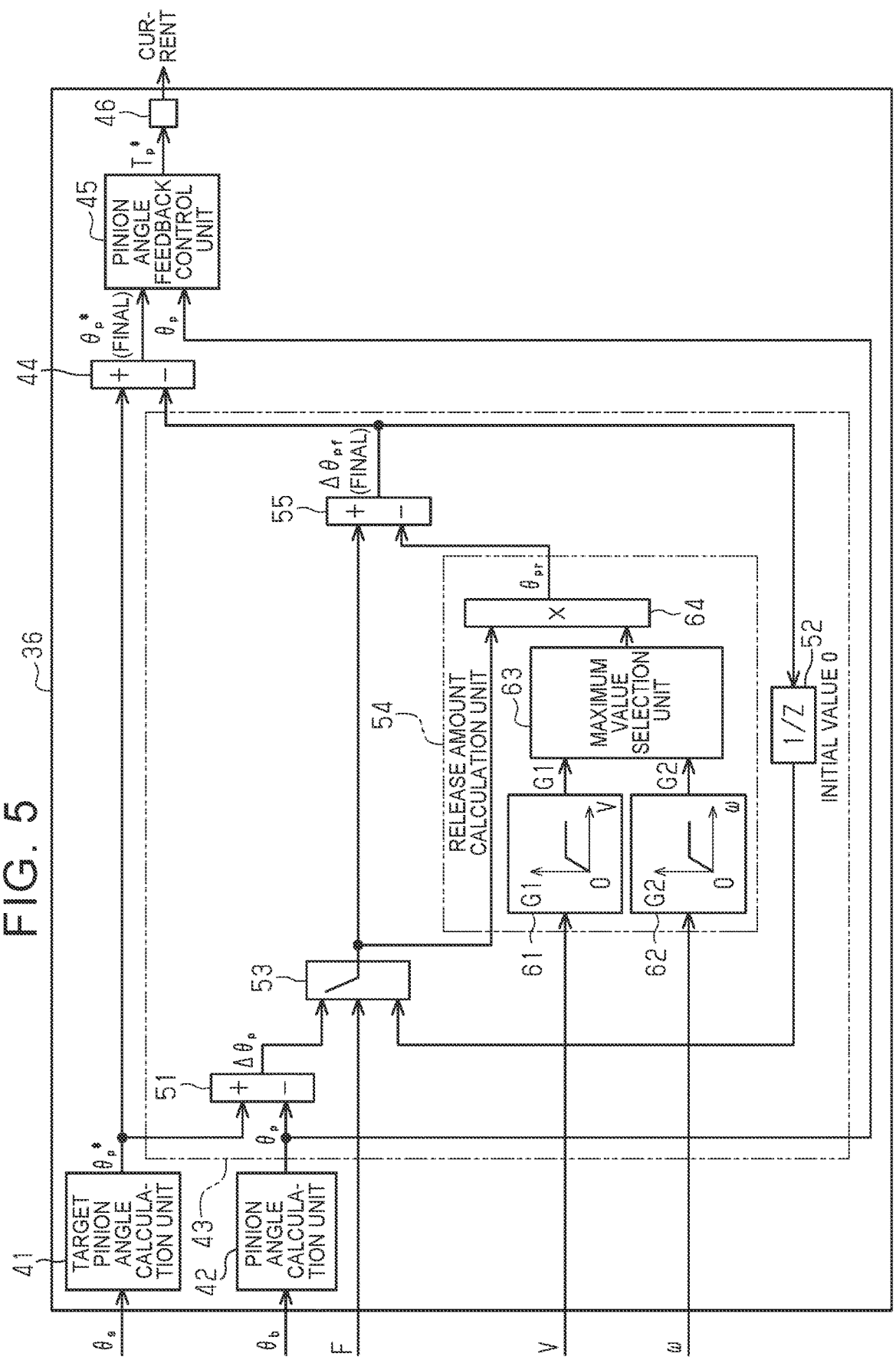
FIG. 5 is a block diagram showing a configuration of a steering operation control unit according to the embodiment.

Thus, in the present embodiment, the following configuration is adopted as the steering operation control unit 36 from the viewpoint of further reducing the driver's discomfort. As shown in FIG. 5, the steering operation control unit 36 includes a target pinion angle calculation unit 41, a pinion angle calculation unit 42, an angle difference calculation unit 43, a subtractor 44, a pinion angle feedback control unit 45, and an energization control unit 46.

The target pinion angle calculation unit 41 calculates a target pinion angle $\theta_p^*$ based on the target steering angle $\theta_s^*$ or the steering angle $\theta_s$ calculated by the reaction force control unit 27. The target pinion angle calculation unit 41 calculates the target pinion angle $\theta_p^*$ by, for example, dividing the steering angle $\theta_s$ by the value of the predetermined steering angle ratio. The steering angle ratio is the ratio of the steered angle $\theta_w$ to the steering angle $\theta_s$.

The pinion angle calculation unit 42 calculates the pinion angle $\theta_p$ that is the rotation angle of the pinion shaft 34, based on the rotation angle $\theta_b$ of the steering operation motor 32 that is detected through the rotation angle sensor 35. The pinion angle calculation unit 42 calculates the pinion angle $\theta_p$ by, for example, dividing the rotation angle $\theta_b$ of the steering operation motor 32 by the value of the reduction ratio of the reduction mechanism 33.

The angle difference calculation unit 43 calculates an angle difference $\Delta\theta_p$ that is a difference between the target pinion angle $\theta_p^*$ calculated by the target pinion angle calculation unit 41 and the pinion angle $\theta_p$ calculated by the pinion angle calculation unit 42. Note that the angle difference calculation unit 43 calculates a final angle difference $\Delta\theta_{pf}$ by correcting the value of the angle difference $\Delta\theta_p$ in accordance with the vehicle speed V and the steering angular velocity ω. The angle difference calculation unit 43 will be described in detail later.

The subtractor 44 calculates the difference between the target pinion angle $\theta_p^*$ calculated by the target pinion angle calculation unit 41 and the final angle difference $\Delta\theta_{pf}$ calculated by the angle difference calculation unit 43, as the final target pinion angle $\theta_p^*$.

The pinion angle feedback control unit 45 takes in the final target pinion angle $\theta_p^*$ calculated by the subtractor 44 and the actual pinion angle $\theta_p$ calculated by the pinion angle calculation unit 42. The pinion angle feedback control unit 45 calculates a pinion angle command value $T_p^*$ by executing the feedback control of the pinion angle $\theta_p$ such that the actual pinion angle $\theta_p$ follows the final target pinion angle $\theta_p^*$.

The energization control unit 46 supplies the current corresponding to the pinion angle command value $T_p^*$ calculated by the pinion angle feedback control unit 45 to the steering operation motor 32. Specifically, the energization control unit 46 calculates the current command value for the steering operation motor 32 based on the pinion angle command value $T_p^*$. Furthermore, the energization control unit 46 detects the value of the current supplied to the steering operation motor 32 through the current sensor provided in the power supply path to the steering operation motor 32. The energization control unit 46 obtains a deviation between the current command value and the value of the current supplied to the steering operation motor 32, and controls the power supply to the steering operation motor 32 so as to eliminate the deviation. As a result, the steering operation motor 32 rotates by an angle corresponding to the pinion angle command value $T_p^*$.

Next, the angle difference calculation unit 43 will be described in detail. As shown in FIG. 5, the angle difference calculation unit 43 includes a subtractor 51, a previous value retention unit 52, a switch 53, a release amount calculation unit 54, and a subtractor 55.

The subtractor 51 calculates the angle difference $\Delta\theta_p$ that is a difference between the target pinion angle $\theta_p^*$ calculated by the target pinion angle calculation unit 41 and the pinion angle $\theta_p$ calculated by the pinion angle calculation unit 42.

The previous value retention unit 52 takes in the final angle difference $\Delta\theta_{pf}$ calculated by the angle difference calculation unit 43, and retains this final angle difference $\Delta\theta_{pf}$. The angle difference calculation unit 43 calculates the final angle difference $\Delta\theta_{pf}$ in a predetermined calculation cycle, and the final angle difference $\Delta\theta_{pf}$ retained by the previous value retention unit 52 is updated each time the final angle difference $\Delta\theta_{pf}$ is calculated by the angle difference calculation unit 43. That is, the final angle difference $\Delta\theta_{pf}$ retained by the previous value retention unit 52 represents the previous value (final angle difference $\Delta\theta_{pf}$ one calculation cycle before) with respect to the final angle difference $\Delta\theta_{pf}$ serving as the current value calculated by the angle difference calculation unit 43. The initial value of the value retained in the previous value retention unit 52 is "0".

As a data input, the switch 53 takes in the angle difference $\Delta\theta_p$ calculated by the subtractor 51 and the final angle difference $\Delta\theta_{pf}$ retained by the previous value retention unit 52. Furthermore, the switch 53 takes in the value of the flag F set by the reaction force control unit 27 as a control input.

The switch 53 selects either the angle difference $\Delta\theta_p$ calculated by the subtractor 51 or the final angle difference $\Delta\theta_{pf}$ retained by the previous value retention unit 52 based on the value of the flag F. The switch 53 selects the angle difference $\Delta\theta_p$ calculated by the subtractor 51 when the value of the flag F is "0". The switch 53 selects the final angle difference $\Delta\theta_{pf}$ retained by the previous value retention unit 52 when the value of the flag F is "1" (more accurately, when the value of the flag F is not "0").

The release amount calculation unit 54 calculates a release amount $\theta_{pr}$. The release amount $\theta_{pr}$ is used in order to gradually change the value of the final target pinion angle $\theta_p^*$ toward the true value of the target pinion angle $\theta_p^*$ calculated by the target pinion angle calculation unit 41 starting from the value of the pinion angle $\theta_p$ calculated by the pinion angle calculation unit 42. The release amount $\theta_{pr}$ is the amount of change in the angle difference $\Delta\theta_p$ for each calculation cycle when the value of the final angle difference $\Delta\theta_{pf}$ calculated by the angle difference calculation unit 43 is gradually changed toward "0".

The release amount calculation unit 54 includes a first gain calculation unit 61, a second gain calculation unit 62, a maximum value selection unit 63, and a multiplier 64. The first gain calculation unit 61 calculates a first gain G1 based on the vehicle speed V. The first gain calculation unit 61 calculates the first gain G1 that has a larger value as the vehicle speed V increases starting from "0". After the vehicle speed V reaches a predetermined vehicle speed threshold value, the first gain calculation unit 61 sets the value of the first gain G1 to a predetermined value (for example, "1") regardless of the vehicle speed V. The vehicle speed threshold value is set from the viewpoint of determining whether the stopped vehicle has started.

The second gain calculation unit 62 calculates a second gain G2 based on the steering angular velocity $\omega$. The second gain calculation unit 62 calculates the second gain G2 that has a larger value as the vehicle angular velocity $\omega$ increases starting from "0". After the steering angular velocity $\omega$ reaches a predetermined angular velocity threshold value, the second gain calculation unit 62 sets the value of the second gain G2 to a predetermined value (for example, "1") regardless of the steering angular velocity $\omega$. The angular velocity threshold value is set from the viewpoint of determining whether the steering wheel 11 has been operated by the driver.

The maximum value selection unit 63 takes in the first gain G1 calculated by the first gain calculation unit 61 and the second gain G2 calculated by the second gain calculation unit 62, and selects one of these first and second gains G1 and G2 which has a larger value.

The multiplier 64 calculates the release amount $\theta_{pr}$ by multiplying the angle difference $\Delta\theta_p$ selected by the switch 53 by the first gain G1 or the second gain G2 selected by the maximum value selection unit 63.

The subtractor 55 calculates the final angle difference $\Delta\theta_{pf}$ by subtracting the release amount $\theta_{pr}$ calculated by the release amount calculation unit 54 from the angle difference $\Delta\theta_p$ selected by the switch 53.

Thus, when the power of the vehicle is switched from off to on, the steering operation control unit 36 operates as follows. When the power of the vehicle is turned on, the value of the flag F is "0" during the period from the start of execution of the initial operation by the reaction force control unit 27 to the completion of execution. Therefore, the switch 53 selects the angle difference $\Delta\theta_p$ calculated by the subtractor 51. When the values of the vehicle speed V and the steering angular velocity $\omega$ are "0", the values of the first gain G1 and the second gain G2 are both "0". Since the value of the release amount $\theta_{pr}$ is also "0", the angle difference $\Delta\theta_p$ selected by the switch 53 (here, the angle difference $\Delta\theta_p$ calculated by the subtractor 51) is used as the final angle difference $\Delta\theta_{pf}$. That is, the angle difference $\Delta\theta_p$ calculated by the subtractor 51 immediately after the power of the vehicle is turned on is retained.

Then, the subtractor 44 calculates the final target pinion angle $\theta_p^*$ by subtracting the final angle difference $\Delta\theta_{pf}$ calculated by the subtractor 55 (here, the angle difference $\Delta\theta_p$ calculated by the subtractor 51 immediately after the power of the vehicle is turned on) from the target pinion angle $\theta_p^*$ calculated by the target pinion angle calculation unit 41. At this time, the final angle difference $\Delta\theta_{pf}$ calculated by the subtractor 55 has the same value as the angle difference $\Delta\theta_p$ calculated by the subtractor 51. Therefore, as expressed by the following equation (B3), the value of the final target pinion angle $\theta_p^*$ has the same value as the pinion angle $\theta_p$ calculated by the pinion angle calculation unit 42. Thus, the steered wheels 12, 12 are maintained in a stopped state without being steered. The following equation (B3) is based on the following equations (B1) and (B2).

$$\Delta\theta_p = \theta_p^* - \theta_p \tag{B1}$$

$$\theta_p^* = \Delta\theta_p + \theta_p \tag{B2}$$

$$\theta_p^*(\text{final}) = \theta_p^* - \Delta\theta_{pf} = (\Delta\theta_p + \theta_p) - \Delta\theta_{pf} = \theta_p \tag{B3}$$

Figure 6:
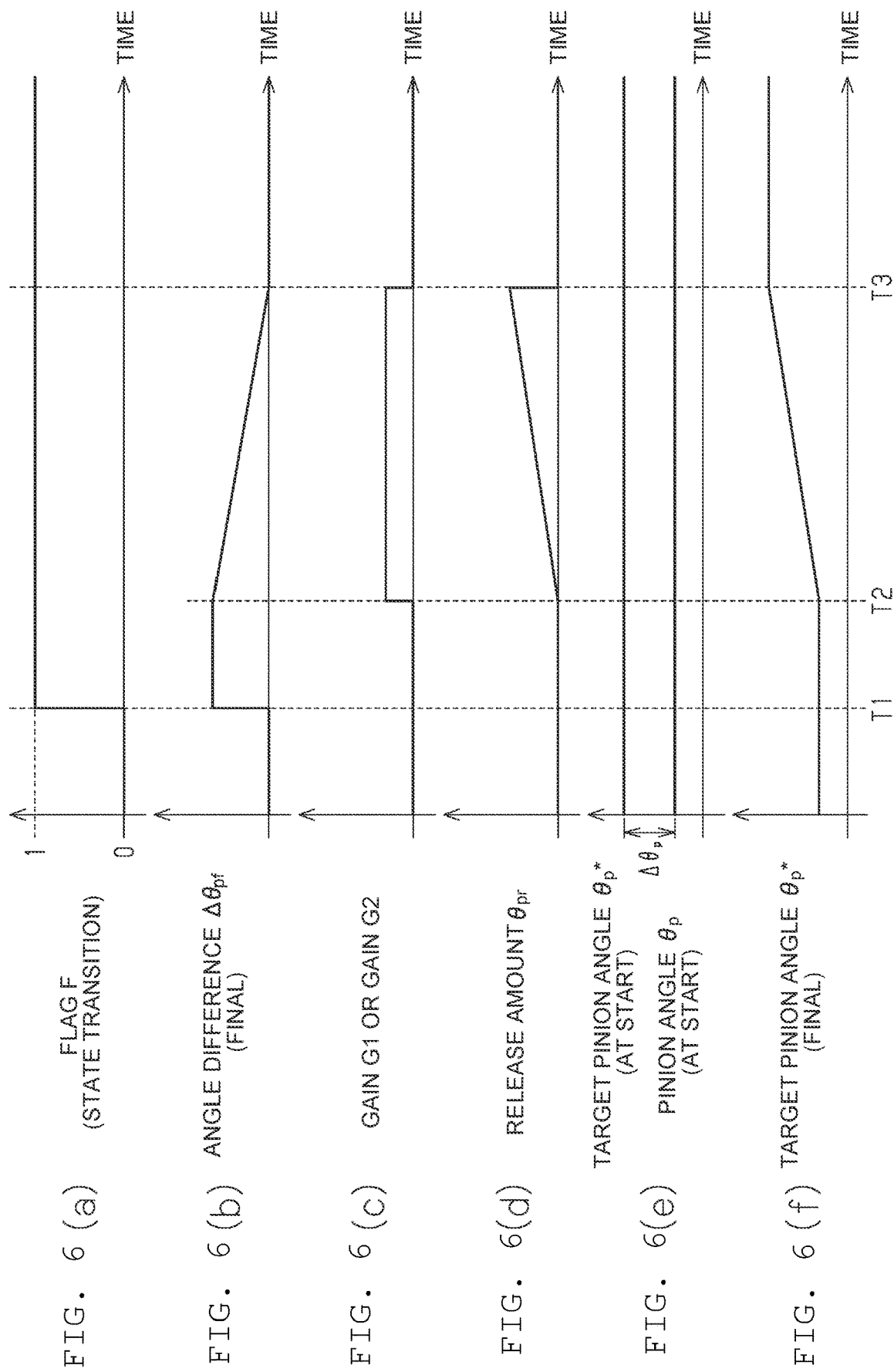
FIG. 6 (a)-FIG. 6 (f) shows timing charts, in which FIG. 6 (a) is a timing chart showing an on/off state of a flag indicating execution completion of synchronization control by the reaction force control unit of the embodiment, FIG. 6 (b) is a timing chart showing a temporal change in an angle difference between a target pinion angle and a pinion angle in the embodiment, FIG. 6 (c) is a timing chart showing a temporal change in gain in the embodiment, FIG. 6 (d) is a timing chart showing a temporal change in a release amount with respect to the angle difference between the target pinion angle and the pinion angle in the embodiment, FIG. 6 (e) is a timing chart showing the target pinion angle and the pinion angle at the time of execution completion of the synchronization control by the reaction force control unit of the embodiment, and FIG. 6 (f) is a timing chart showing a temporal change in a final target pinion angle.

Next, as shown in (a) of FIG. 6, when the execution of the initial operation by the reaction force control unit 27 is completed (time T1), the value of the flag F is switched from "0" to "1". Therefore, the switch 53 selects the angle difference $\Delta\theta_p$ serving as the final angle difference $\Delta\theta_{pf}$ retained by the previous value retention unit 52. Here, when the values of the vehicle speed V and the steering angular velocity $\omega$ are "0", the values of the first gain G1 and the second gain G2 are both "0", as shown in (c) of FIG. 6. At this time, as shown in (d) of FIG. 6, the value of the release amount $\theta_{pr}$ is also "0". Therefore, the angle difference $\Delta\theta_p$ selected by the switch 53 (here, the angle difference $\Delta\theta_p$ retained by the previous value retention unit 52) is used as the final angle difference $\Delta\theta_{pf}$. That is, the final angle difference $\Delta\theta_{pf}$ immediately after the value of the flag F is switched from "0" to "1" (here, the angle difference $\Delta\theta_p$ calculated by the subtractor 51 immediately after the power of the vehicle is turned on) is retained.

Then, the subtractor 44 calculates the final target pinion angle $\theta_p^*$ by subtracting the previous value of the final angle difference $\Delta\theta_{pf}$ retained by the previous value retention unit 52 (here, the angle difference $\Delta\theta_p$ calculated by the subtractor 51 immediately after the power of the vehicle is turned on) from the target pinion angle $\theta_p^*$ calculated by the target pinion angle calculation unit 41. At this time, the previous value of the final angle difference $\Delta\theta_{pf}$ retained by the previous value retention unit 52 has the same value as the angle difference $\Delta\theta_p$ calculated by the subtractor 51 immediately after the power of the vehicle is turned on. Therefore, as shown in (e) and (f) of FIG. 6, the value of the final target pinion angle $\theta_p^*$ has the same value as the pinion angle $\theta_p$ calculated by the pinion angle calculation unit 42 immediately after the power of the vehicle is turned on. Thus, the steered wheels 12, 12 are maintained in a stopped state without being steered.

In this state, when the vehicle starts in a steering holding state where the steering wheel 11 is held at a predetermined rotation position (time T2), for example, the multiplier 64 calculates the release amount $\theta_{pr}$ by multiplying the angle difference $\Delta\theta_p$ selected by the switch 53 (here, the angle difference $\Delta\theta_p$ retained by the previous value retention unit 52) by the first gain G1 corresponding to the vehicle speed V. The subtractor 55 calculates the final angle difference $\Delta\theta_{pf}$ by subtracting the release amount $\Delta\theta_{pr}$ from the angle difference $\Delta\theta_p$ selected by the switch 53 (here, the angle difference $\Delta\theta_p$ retained by the previous value retention unit 52). That is, the value of the final angle difference $\Delta\theta_{pf}$ calculated by the subtractor 55 decreases by the release amount $\theta_{pr}$.

Thus, as shown in (b) and (f) of FIG. 6, the value of the final target pinion angle $\theta_p$ calculated by the subtractor 44 increases by the amount by which the value of the final angle difference $\Delta\theta_{pf}$ decreases. After that, as shown in (b) and (d) of FIG. 6, the value of the final angle difference $\Delta\theta_{pf}$ gradually decreases at each calculation cycle of the steering operation control unit 36 in accordance with the value of the release amount $\theta_{pr}$. Thus, as shown in (f) of FIG. 6, the value of the final target pinion angle $\theta_p$ gradually increases at each calculation cycle of the steering operation control unit 36. Eventually, as shown in (b) and (f) of FIG. 6, the value of the final target pinion angle $\theta_p^*$ reaches its true value, that is, the target pinion angle $\theta_p^*$ calculated by the target pinion angle calculation unit 41, at the timing when the value of the final angle difference $\Delta\theta_{pf}$ becomes "0" (time T3). As a result, the steered position of the steered wheels 12, 12 is synchronized with the rotation position of the steering wheel 11.

A case where the steering wheel 11 is operated while the vehicle is stopped is the same as the case where the vehicle starts while the steering wheel 11 is held. That is, the value of the final target pinion angle $\theta_p^*$ gradually increases toward the true value of the target pinion angle $\theta_p^*$ calculated by the target pinion angle calculation unit 41, triggered by the start of steering of the steering wheel 11 (time T2).

Next, the process procedure of the initial operation executed by the steering operation control unit 36 after the power of the vehicle is turned on will be described with reference to the flowchart of FIG. 7. The process of this flowchart is executed, triggered by the fact that the value of the flag F of the reaction force control unit 27 is switched from "0" to "1", after the power of the vehicle is turned on.

Figure 7:
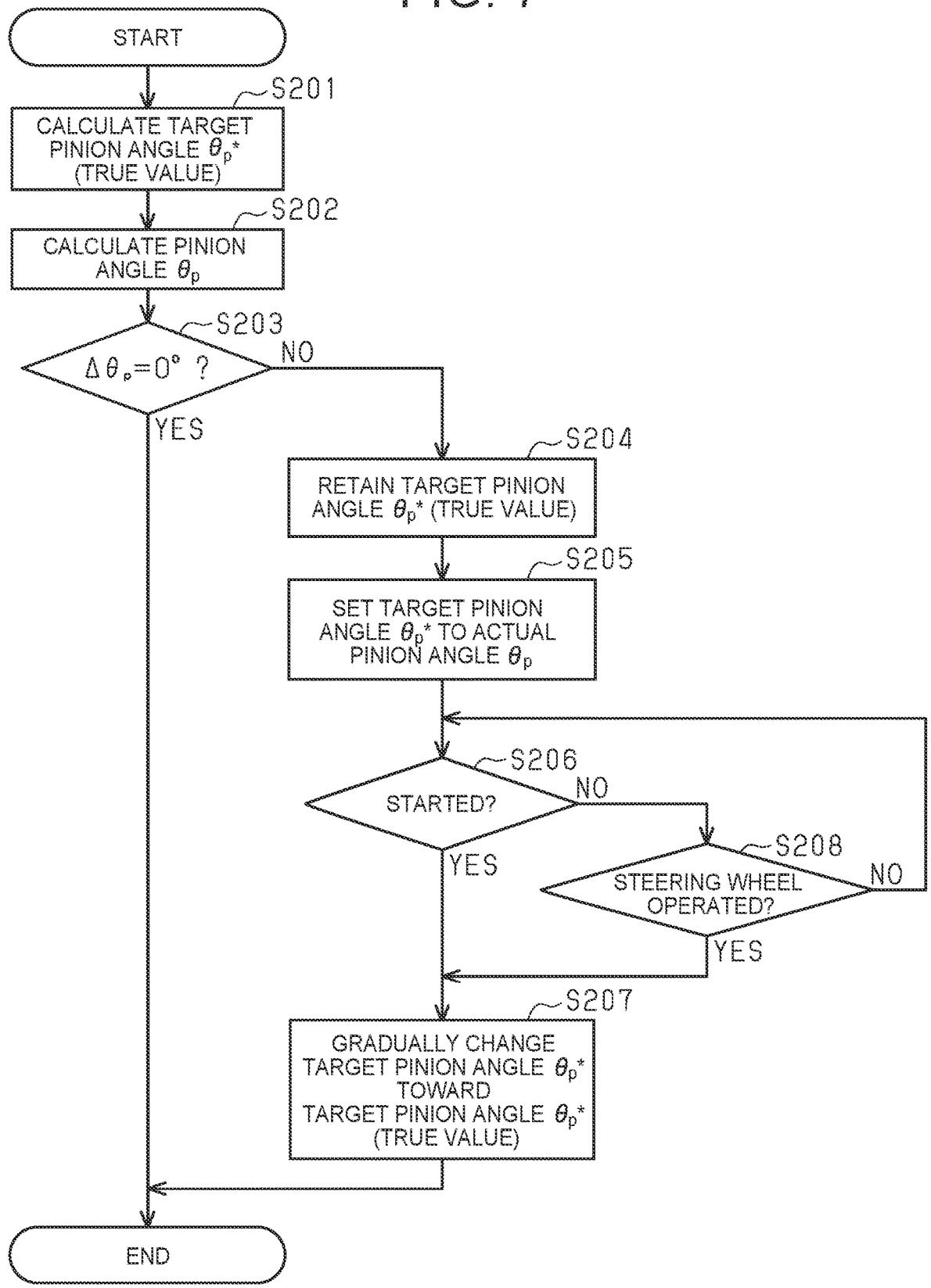
FIG. 7 is a flowchart showing a process procedure of synchronization control by the steering operation control unit of the embodiment.

As shown in the flowchart of FIG. 7, the steering operation control unit 36 calculates the target pinion angle $\theta_p^*$ based on the steering angle $\theta_s$ acquired through the reaction force control unit 27 (step S201). The steering operation control unit 36 calculates the pinion angle $\theta_p$ based on the rotation angle $\theta_b$ of the steering operation motor 32 that is detected through the rotation angle sensor 35 (step S202).

Next, the steering operation control unit 36 determines whether the angle difference $\Delta\theta_p$ between the target pinion angle $\theta_p^*$ and the pinion angle $\theta_p$ is "0" (step S203). The steering operation control unit 36 ends the process when the angle difference $\Delta\theta_p$ is "0" (YES in step S203). When the angle difference $\Delta\theta_p$ is not "0" (NO in step S203), the steering operation control unit 36 retains the target pinion angle $\theta_p^*$ calculated in the preceding step S201 (step S204), and sets the target pinion angle $\theta_p^*$ to the same value as the pinion angle $\theta_p$ (step S205).

Next, the steering operation control unit 36 determines whether the vehicle has started by, for example, comparing the vehicle speed V with the vehicle speed threshold value (step S206). When it is determined that the vehicle has started (YES in step S206), the steering operation control unit 36 shifts the process to step S207. When it is not determined that the vehicle has started (NO in step S206), the steering operation control unit 36 shifts the process to step S208.

In step S208, the steering operation control unit 36 determines whether the steering wheel 11 has been operated by, for example, comparing the steering angular velocity with the angular velocity threshold value. When it is not determined that the steering wheel 11 has been operated, the steering operation control unit 36 shifts the process to the preceding step S206. When it is determined that the steering wheel 11 has been operated, the steering operation control unit 36 shifts the process to step S207.

In step S207, the steering operation control unit 36 gradually changes the target pinion angle $\theta_p^*$ toward the true value of the target pinion angle $\theta_p^*$ retained at the preceding step S204. The steering operation control unit 36 ends the process when the value of the target pinion angle $\theta_p^*$ reaches the true value.

The steering operation control unit 36 causes the value of the pinion angle $\theta_p$ to match the true value of the target pinion angle $\theta_p^*$ through the execution of the feedback control for causing the pinion angle $\theta_p$ to follow the true value of the target pinion angle $\theta_p^*$. As a result, the steered position of the steered wheels 12, 12 is changed to the position corresponding to the rotation position of the steering wheel 11.

Effects of Embodiment

Thus, according to the present embodiment, the following effects can be obtained.

(1) At the timing when at least one of the starting of the vehicle and the steering of the steering wheel 11 is performed for the first time after the power of the vehicle is turned on, the steered position of the steered wheels 12, 12 is automatically adjusted to the position corresponding to the rotation position of the steering wheel 11. Therefore, as compared with the case where the steered position is automatically adjusted in the stopped state or the non-steering state, it is possible to reduce the driver's discomfort or stress with respect to the automatic adjustment operation for the steered position of the steered wheels 12, 12.

(2) When the power of the vehicle is turned on and the deviation amount $\Delta\theta$ of the rotation position of the steering wheel 11 with respect to the steered position of the steered wheels 12, 12 has a value equal to or larger than the angle threshold value $\theta_{th}$, the synchronization control of the steering wheel 11 is executed. The rotation position of the steering wheel 11 is completely synchronized with the steered position of the steered wheels 12, 12 through the execution of the synchronization control. Accordingly, for example, when the vehicle is started, the steered position of the steered wheels 12, 12 does not suddenly change toward the position corresponding to the rotation position of the steering wheel 11. Thus, the driver can start the vehicle smoothly without feeling a sense of discomfort.

(3) When the power of the vehicle is turned on and the deviation amount $\Delta\theta$ of the rotation position of the steering wheel 11 with respect to the steered position of the steered wheels 12, 12 is smaller than the angle threshold value $\theta_{th}$, the synchronization control of the steering wheel 11 is not executed. At the timing when at least one of the starting of the vehicle and the steering of the steering wheel 11 is performed for the first time after the power of the vehicle is turned on, the steered position of the steered wheels is automatically adjusted to the position corresponding to the rotation position of the steering wheel. With this, the steering wheel 11 does not automatically rotate at the timing when the power of the vehicle is turned on, so that the driver does not feel a sense of discomfort. Furthermore, since the driver does not have to wait for the execution of the synchronization control of the steering wheel 11 to be completed, the driver does not feel stress.

(4) When the steered position of the steered wheels 12, 12 is automatically adjusted to the position corresponding to the rotation position of the steering wheel 11, the steered position of the steered wheels 12, 12 gradually changes toward the position corresponding to the rotation position of the steering wheel 11. Since the sudden movement of the steered wheels 12, 12 is suppressed, the driver is less likely to feel a sense of discomfort.

Other Embodiments

The present embodiment may be modified as follows. As shown by the long dashed double-short dashed line in FIG. 1, for example, when a notification device 28 is provided in the vehicle cabin, the reaction force control unit 27 may notify the driver of the start of execution and the completion of execution of the position adjustment of the steering wheel 11, through the notification device 28. Examples of the notification operation by the notification device 28 include displaying a message in text and issuing a message by voice. This allows the driver to recognize that the steering wheel 11 automatically rotates and the automatically rotating steering wheel 11 automatically stops, thereby reducing a sense of discomfort given to the driver. Furthermore, the steering operation control unit 36 may notify the driver of the start of execution and the completion of execution of the automatic adjustment of the steered position through the notification device 28. This allows the driver to recognize that the automatic adjustment of the steered position is being performed, thereby reducing a sense of discomfort given to the driver.

In the present embodiment, the steering angle $\theta_s$ calculated based on the rotation angle $\theta_a$ of the reaction motor 22 is used. However, when a configuration having a steering angle sensor is adopted as the steering system 10, the steering angle $\theta_s$ detected through the steering angle sensor may be used.

In the present embodiment, the steering angle ratio is set to an appropriate value in accordance with the product specifications and the like. The steering angle ratio may be, for example, "$\theta_s:\theta_w=1:1$" or "$\theta_s:\theta_w=1:3$". For example, in the case where the steering angle ratio is "$\theta_s:\theta_w=1:3$", when the steering angle $\theta_s$ deviates by 10°, the steered angle $\theta_w$ deviates by 30°. Thus, it is more desirable to correctly synchronize the steering angle $\theta_s$ and the steered angle $\theta_w$.

In the present embodiment, in the process shown in the flowchart of FIG. 2, when the deviation amount $\Delta\theta$ calculated in step S101 does not have a value smaller than the angle threshold value $\theta_{th}$ (NO in step S102), the reaction force control unit 27 causes the steering wheel 11 to rotate such that the deviation amount $\Delta\theta$ becomes "0". However, the deviation amount $\Delta\theta$ does not necessarily have to be "0". For example, an angle may be adopted that does not give a sense of discomfort to the driver when the steered position of the steered wheels 12, 12 is corrected to match the rotation position of the steering wheel 11 at the timing of starting the vehicle, that is, an angle exceeding "0" and within the range smaller than the threshold value $\theta_{th}$, for example. Even with this configuration, the same effects as in (3) of the first embodiment can be obtained.

In the present embodiment, the reaction force control unit 27 executes the process shown in the flowchart of FIG. 2 as the initial operation when the power of the vehicle is switched from off to on. However, depending on the product specifications and the like, the reaction force control unit 27 may adopt a configuration in which the process execution function shown in the flowchart of FIG. 2 is omitted. In this case, regardless of the value of the deviation amount $\Delta\theta$ of the rotation position of the steering wheel 11 with respect to the steered position of the steered wheels 12, 12, the steering operation control unit 36 executes the process of synchronizing the steered position of the steered wheels 12, 12 with the rotation position of the steering wheel 11 at the timing of starting of the vehicle or steering of the steering wheel 11.

In the present embodiment, the power supply of the vehicle may include, for example, an accessory power supply (ACC power supply) or an ignition power supply (IG power supply). The reaction force control unit 27 and the steering operation control unit 36 may be configured as a single control device.

In the present embodiment, an example of adopting a so-called linkless structure in which there is no mechanical power transmission between the steering shaft 21 and the steered wheels 12 has been described as the steering system 10 of the vehicle. However, a structure may be adopted in which the power transmission between the steering shaft 21 and the steered wheels 12 can be disabled by a clutch. When the clutch is disengaged, the power transmission between the steering wheel 11 and the steered wheels 12 is disabled. When the clutch is engaged, the power transmission between the steering wheel 11 and the steered wheels 12 is enabled.

What is claimed is:

1. A steering system comprising:
  a steering operation shaft in which power transmission to and from a steering wheel is disabled and that steers a steered wheel of a vehicle;
  a steering operation motor that generates a steering operation force that is a torque applied to the steering operation shaft so as to steer the steered wheel;
  a control device includes an electronic controller configured to control the steering operation motor;
  a steering shaft that rotates in conjunction with operation of the steering wheel; and
  a reaction motor that generates a steering reaction force that is a torque applied to the steering shaft and acting in a direction opposite to a steering direction, wherein:
  the control device determines a rotation position of the steering wheel and a steered position of the steered wheel as an initial operation in response to an ignition power supply being turned on;
  the control device determines a deviation amount of the rotation position of the steering wheel with regards to the rotation position corresponding to the steered position of the steered wheel;
  in a case where at least one of starting of the vehicle and steering of the steering wheel is performed a first time after the ignition power supply being turned on, when the rotation position of the steering wheel is different from the rotation position corresponding to the steered position of the steered wheel, the control device executes a process for correcting the steered position of the steered wheel to a position corresponding to the rotation position of the steering wheel through the steering operation motor;
  during the process for correcting the steered position of the steered wheel to the position corresponding to the rotation position of the steering wheel, the control device controls the steering operation motor such that the steered position of the steered wheel incrementally changes toward the position corresponding to the rotation position of the steering wheel based on a vehicle speed or a steering angular velocity; and the control device has a function of executing, when the ignition power supply is turned on and the rotation position of the steering wheel is different from a correct rotation position corresponding to the steered position of the steered wheel, a correction process of causing the steering wheel to rotate through the reaction motor so as to reduce the deviation amount of the rotation position of the steering wheel with respect to the correct rotation position;

in a case where the ignition power supply is turned on:

the control device determines whether the deviation amount is equal to or more than a predetermined allowable amount, when the deviation amount is equal to or more than the predetermined allowable amount, the control device executes the correction process prior to the starting of the vehicle, and when the deviation amount is less than the predetermined allowable amount, the control device executes the process for correcting the steered position of the steered wheel to the position corresponding to the rotation position of the steering wheel without executing the correction process.

\* \* \* \* \*